Oct. 15, 1963   J. F. MILLER   3,106,852
REVERSE GEAR TRANSMISSION SHIFTER

Filed Oct. 12, 1961   3 Sheets-Sheet 1

INVENTOR.
JOSEPH F. MILLER
BY Hazard & Miller
ATTORNEYS

Oct. 15, 1963
J. F. MILLER
3,106,852
REVERSE GEAR TRANSMISSION SHIFTER
Filed Oct. 12, 1961
3 Sheets-Sheet 2
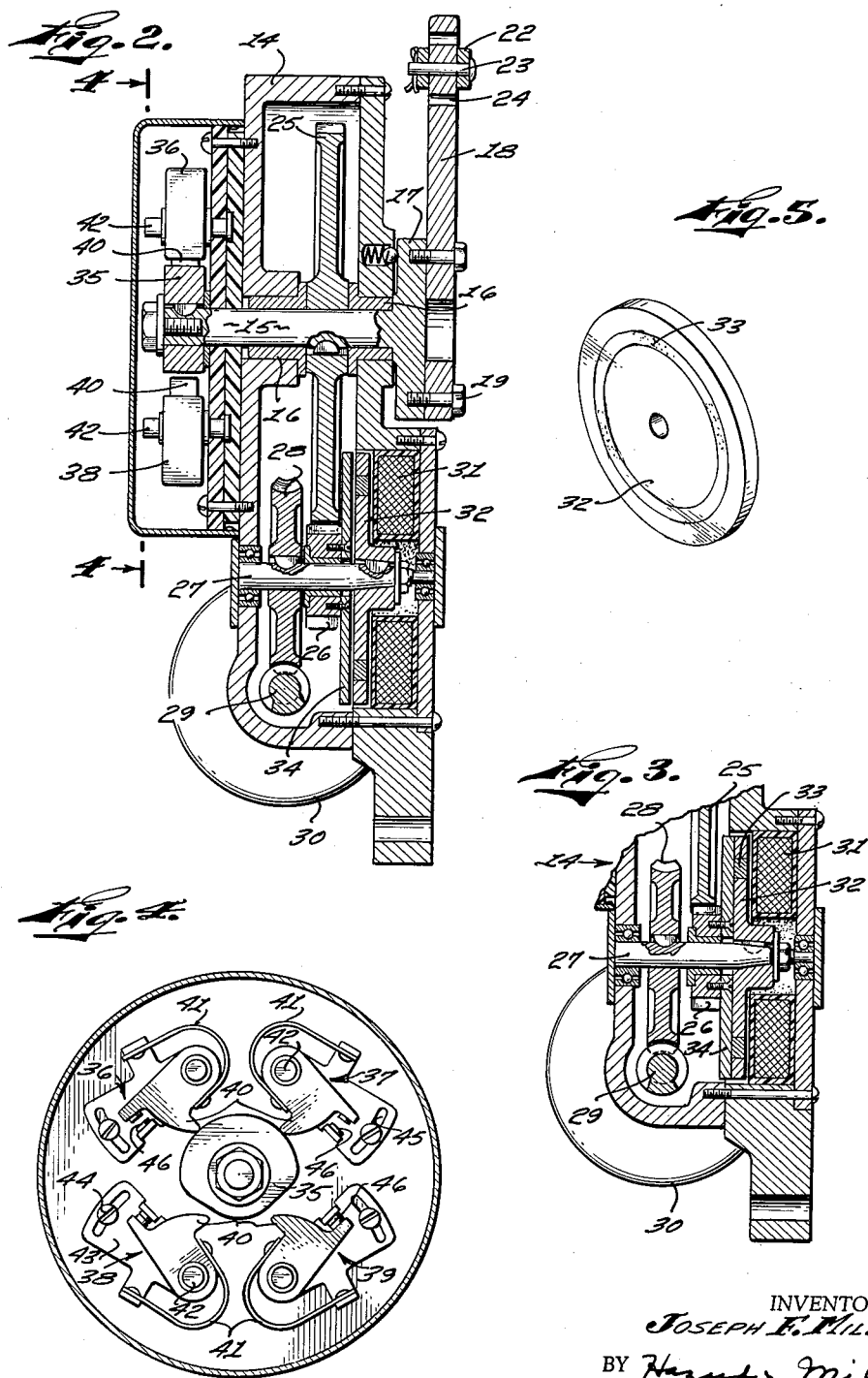
INVENTOR.
JOSEPH F. MILLER
BY Hazard + Miller
ATTORNEYS

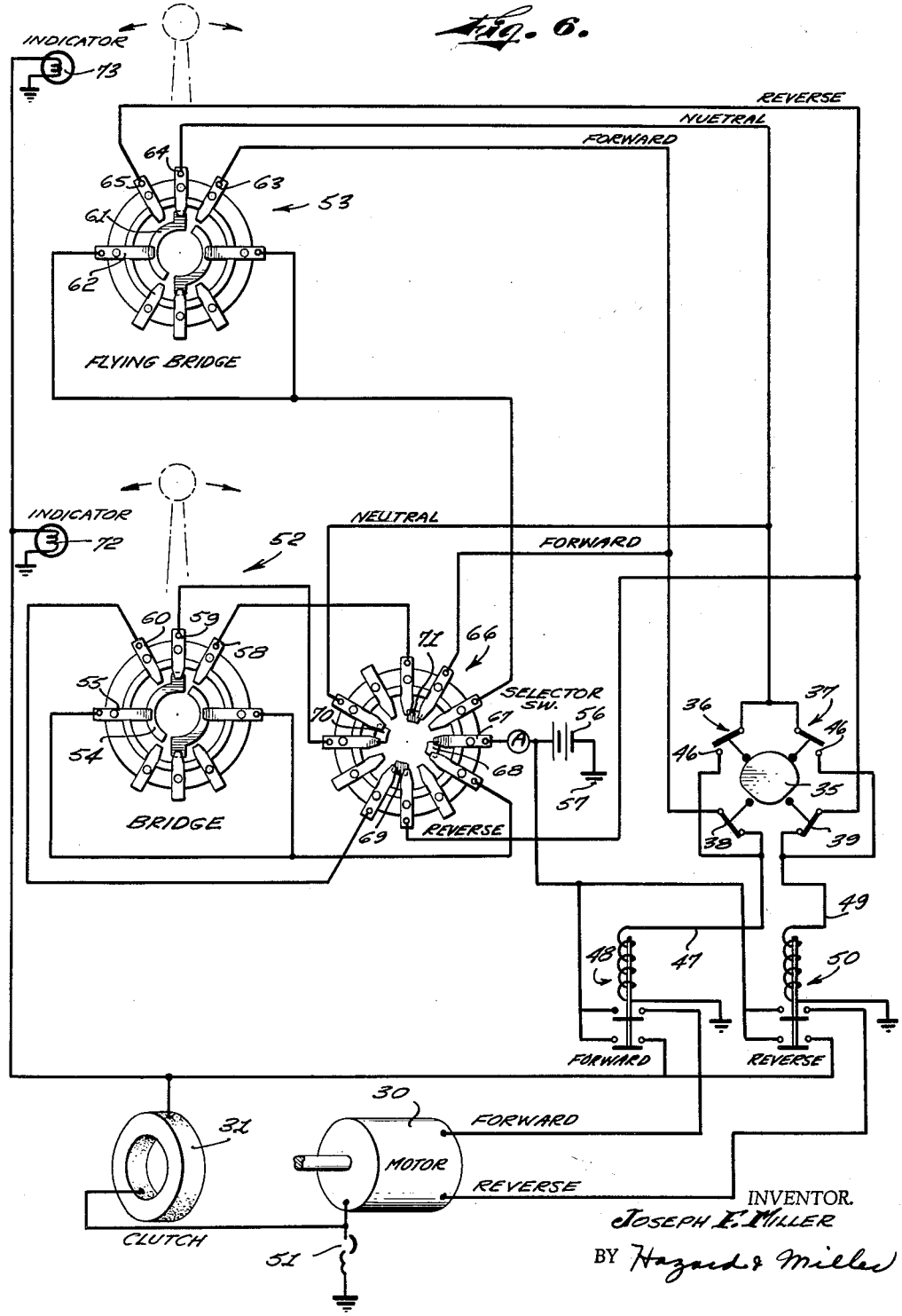

United States Patent Office 3,106,852
Patented Oct. 15, 1963

3,106,852
REVERSE GEAR TRANSMISSION SHIFTER
Joseph F. Miller, 166 Cecil Place, Costa Mesa, Calif.
Filed Oct. 12, 1961, Ser. No. 144,603
6 Claims. (Cl. 74—365)

This invention relates to reverse gear transmission shifter.

Explanatory of the present invention, the conventional marine engine used to propel a boat is equipped with a reverse gear transmission usually operated by a crank or lever. This crank or lever is shiftable into either of three positions, namely a forward position wherein power is transmitted from the engine to the propeller to propel the boat forwardly, a neutral position wherein no power is transmitted from the engine to the propeller and the engine is permitted to idle, and a reverse position wherein power transmitted by the engine to the propeller is reversed so as to cause the propeller to be reversely rotated. It has heretofore been proposed to provide a mechanism operable from a control lever on the bridge of the boat which will selectively throw the crank or lever of the reverse gear transmission into either of these three positions at will. Mechanical devices for accomplishing this have heretofore been cumbersome and complex and electrical devices for accomplishing the same purpose have been not only complex but have been subject to failure at critical times.

An object of the present invention is to provide an improved electrically operable construction that may be operated from the bridge of the boat and which will selectively shift the crank or lever of the reverse gear transmission into either of its three positions, namely forward, neutral, or reverse.

More specifically, an object of the present invention is to provide an electrical mechanism for shifting the reverse gear transmission which is so designed as to "fail safe." That is, in the event that an element of the mechanism should fail to function or improperly function the mechanism will not destroy itself but will be left in such a condition that if necessary, the reverse gear transmission can be manually operated, without being required to disconnect the mechanism from the reverse gear transmission.

Still another object of the invention is to provide an electrically operable means for shifting a reverse gear transmission wherein an indicator is used to indicate at the bridge the fact that the transmission is being shifted properly and which will also indicate that there has been a malfunctioning of the apparatus in the event that this occurs so that remedial steps can be properly taken, or if necessary, the reverse gear transmission can be operated manually.

A further object of the invention is to provide a reverse gear transmission shifter having the above-mentioned characteristics which is so designed that two or more separate control levers may be employed, one on the bridge of the boat of the vessel and another on the flying bridge of the boat or vessel, and to provide means whereby either control can be selectively connected to the mechanism to the exclusion of the other. In this manner, if the control used is that which is located on the flying bridge manipulation of the control on the regular bridge of the vessel cannot transmit conflicting signals to the mechanism which operates the crank or lever of the reverse gear transmission.

With the foregoing and other objects in view, which will be made manifest in the following detailed description and specifically pointed out in the appended claims, reference is had to the accompanying drawings for an illustrative embodiment of the invention, wherein:

FIG. 2 is a vertical section taken substantially upon the line 2—2 upon FIG. 1 in the direction indicated, and illustrating the unit in its deenergized condition;

FIG. 3 is a partial vertical section similar to FIG. 2, but illustrating the unit in its energized condition;

FIG. 4 is a vertical section taken substantially upon the line 4—4 upon FIG. 2 in the direction indicated;

FIG. 5 is a perspective view of an element of the magnetic clutch which is employed as a part of the unit; and FIG. 6 is a wiring diagram.

Figure 1:
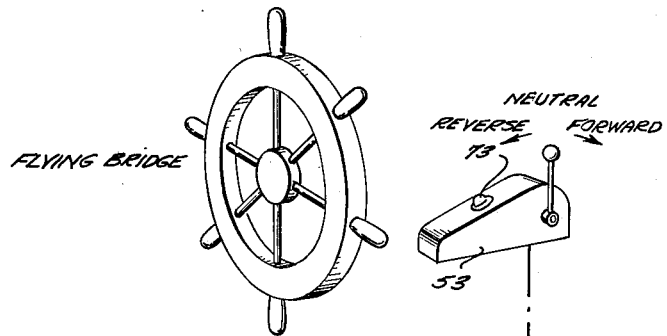
FIGURE 1 is a diagrammatic view in perspecive illustrating the operating lever of a reverse gear transmission, the unit embodying the invention as having been connected thereto and controls therefor located on the bridge and flying bridge.
Figure 1:
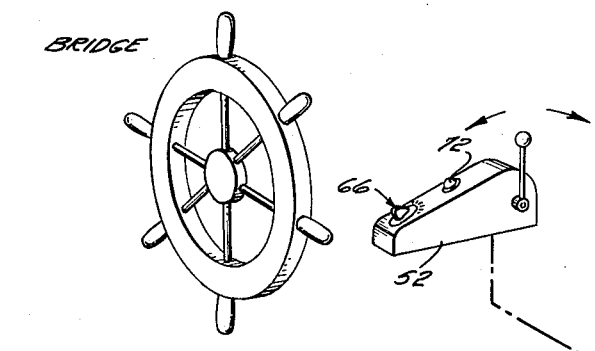
Figure 1:
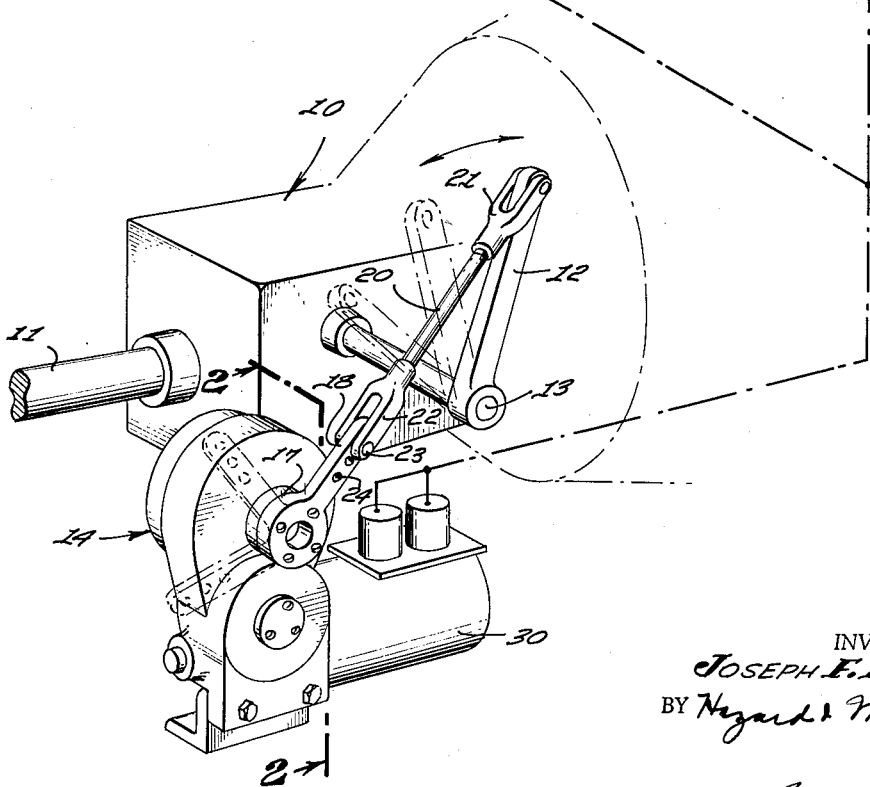

Referring to the accompanying drawings wherein similar reference characters designate similar parts throughout, a marine engine or other power source (not shown) is assumed to be equipped with a reverse gear transmission 10 through which power from the engine is transmitted to a shaft 11 which may be or which may lead to the propeller shaft. The reverse gear transmission is usually operable by means of a crank or lever 12 on a rocker-shaft 13 which projects laterally from the transmission housing. This crank or lever is shiftable into three positions such as the forward position shown in full lines on FIG. 1, wherein power is transmitted through the transmission from the power source to the shaft 11 to rotate the propeller in a forward direction. The crank or lever 12 is also shiftable into a neutral position illustrated in dotted lines on FIG. 1 wherein no power is transmitted from the power source to shaft 11 but the engine is permitted to idle, and also into a reverse position which is illustrated in dotted lines on FIG. 1 whereby power from the power source is transmitted through the transmission to rotate shaft 11 in a reverse direction. The present invention does not relate to details of the transmission but to an electric mechanism for shifting the crank or lever 12 selectively into either of the three positions.

The construction embodying the present invention comprises a housing 14 in which there is a rotary shaft 15 mounted for rotation in suitable bearings or bushings 16. One end of this shaft extends through a wall of the housing and is equipped with a flange 17 on which a crank is mounted indicated at 18, such as by bolts or cap screws 19.

A rod or link 20 has clevises 21 and 22 threadedly mounted on its ends. The clevis 21 is pivotally connected to the crank or lever 12 of the transmission. The clevis 22 is pivotally connected to the end of the crank 18 such as by a pivot pin 23 that is selectively receivable in any of a series of apertures 24 formed in the crank 18. The threaded connections between the rod 20 and the clevises provides for fine adjustment of the effective length of the rod 20. This rod is preferably adjusted so that when the crank 12 is in its forward position shown in full lines on FIG. 1 that the longitudinal axis of the rod 20 and the longitudinal axis of the crank 18 are in alignment. In other words, when the lever 12 is in its forward position the rod 20 and the crank 18 will be located on the same radius from the center of rotation of the shaft 15. The purpose of this is briefly as follows:

If the crank 12 is forced forwardly beyond its intended position and is held in an overthrown position for a prolonged period of time most transmissions of this character have thrust bearings which are apt to burn out or become damaged. By adjusting the length of rod 20 and its clevises 21 and 22 so that when crank 12 is in its proper forward position the rod 20 will be in alignment or on the same radius with crank 18. Any excess of movement of crank 18 forwardly will not involve an overthrowing of the lever 12. On the contrary, any excess of movement of crank 18 beyond the radial position shown will involve a slight retraction of lever 12 thus protecting the thrust bearing in the transmission. No attempt is made to have rod or link 20 align with crank 18 when the crank 18 and the lever 12 are in reverse position. This is because it rarely occurs that the reverse gear transmission is operated in reverse over a prolonged period of time. Consequently, even though crank 18 may move excessively through its reverse position and cause lever 12 to be urged beyond its normal reverse position there is little, if any, danger of damaging the thrust bearing of the transmission on account of the relatively short period of use.

On the shaft 15 there is a gear 25 which is keyed or otherwise rigidly fastened thereto and this gear meshes with a pinion 26 that is loose or freely rotatable on a countershaft 27. The countershaft 27 is preferably driven by means of a worm wheel 28 which in turn is driven by a worm 29 that is rotated by means of a reversible electric motor 30. Adjacent the end of the countershaft 27 there is a coil or winding 31 of a magnetic clutch. This winding is preferably stationary within the housing 14 but it may be mounted on the countershaft 27 so as to rotate therewith. In the latter event, brushes are required to transmit current to the winding 31. With a stationary winding one side of the winding is connected to ground and the other side of the winding is connected to a source of electric current indicated on FIG. 6 as will hereinafter be described.

Adjacent the winding 31 there is a flanged hub 32 that is keyed or otherwise rigidly secured to the countershaft 27. This flanged hub is circumferentially divided by a ring 33 formed of non-magnetic or non-magnetizable material such as copper or bronze. The balance of the flanged hub 32 is formed of magnetizable material that can be magnetized when the coil or winding 31 is energized. Adjacent the flanged hub 32 there is an armature or plate 34 which is loose on the countershaft 27 but which is rigidly attached to the pinion 26.

When the reversible motor 30 is energized and is driven forwardly the worm 29 drives the worm wheel 28, thus rotating the countershaft 27. When the winding 31 is energized the magnetic flux created thereby is effective through the flanged hub 32 on both sides of the copper or bronze ring 33 to attract the armature plate 34 and the pinion 26. The friction between the armature plate 34 and the flanged hub provides a driving connection between the countershaft 27 and the pinion 26, thus driving the gear 25 and causing the shaft 15 to swing the crank 18 forwardly. Conversely, if the motor 30 is energized to rotate in the reverse direction the worm 29, worm wheel 28 and pinion 26 will be rotated in the reverse direction, thus rotating gear 25, shaft 15, and crank 18 in the reverse direction.

On the end of shaft 15 there is rigidly mounted a cam 35 which is surrounded by four switches generally indicated at 36, 37, 38, and 39. Each of these four switches is equipped with a cam follower 40 engageable with the cam and urged to do so by means of springs 41. These cam followers are pivotally mounted as at 42 on bodies 43 that are adjustable about the pivots by means of screws 44 that are tightenable in slots 45. When the cam followers are out of engagement with the cam 35 as illustrated by the switches 36 and 37 on FIG. 4, the corresponding contacts 46 of these switches are open.

Referring now to FIG. 6, the switch 38 may be regarded as a forward switch and the switch 39 may be regarded as a reverse switch. The two switches 36 and 37 may be regarded as neutral switches, the switch 37 being companion to switch 38 and the switch 36 being companion to switch 39. Switch 36, as shown on FIG. 6 is connected in parallel around switch 38 to a conductor 47 of the winding of a forward relay 48. Switch 37 is connected in parallel around switch 39 to a conductor 49 leading to the winding of a reverse relay 50. The forward relay 48 is connected to the forward lead or terminal of the reversible electric motor 30. In a similar manner the reverse relay 50 is connected to the reverse terminal or lead of the motor 30. One side of the motor is connected to ground and in this connection there is a thermostatic overload circuit breaker 51.

If the mechanism is initially in neutral position and electric current is supplied to the closed contacts of forward switch 38 its relay 48 will be energized to supply electric current to the forward lead of the motor 30 causing the motor to rotate forwardly and thus swing crank 18 into forward position. Similarly, if electric current is supplied to the contacts of switch 39 relay 50 will close supplying current to the reverse lead of the motor and causing the motor to rotate reversely thus swinging the crank 18 in a reverse direction.

There is illustrated two controls, one indicated at 52 which may be assumed to be on the cabin bridge of the boat or vessel and the other of which indicated at 53, may be assumed to be on the flying bridge. These controls are duplicates of each other. Each control has a handle which serves to rotate a rocker-shaft on which, in the case of control 52, carries and rotates an arcuate conductor 54 that is wiped by a stationary contact 55 that is supplied with current from an electric current source 56 such as a storage battery one side of which is grounded as indicated at 57. The arcuate conductor 54 selectively engages contacts 58, 59, and 60 which when operative are electrically connected to the forward switch 38, the neutral switches 36 and 37, and the reverse switch 39, respectively. In a similar manner, control 53 has an arcuate segment 61 that is in constant engagement with a stationary contact 62 but which selectively engages contacts 63, 64, and 65. These contacts are also electrically connected when operative to the forward switch 38, the neutral switches 36 and 37, and the reverse switch 39, respectively. In the connections between the controls 52 and 53 and the switches 36, 37, 38, and 39 there is a selector switch 66. Contact 67 is electrically connected to the battery 56. This selector switch has a rotary part carrying four arcuate conductors 68, 69, 70, and 71. In the position shown, control 52 is electrically connected to the switches 36, 37, 38, and 39 and control 53 is disconnected therefrom. However, if the contactors and rotor are rotated from the position shown in a counterclockwise direction a short distance, control 53 will be electrically connected to the contacts 36, 37, 38, and 39, and control 52 will be disconnected therefrom. The selector switch consequently operatively connects one control to the switches 36, 37, 38, and 39 to the exclusion of the other and consequently it is impossible to transmit to the switches 36, 37, 38, and 39 conflicting signals from the two controls. When one control is operative the other is inoperative.

Adjacent the controls 52 and 53 there are indicators 72 and 73, respectively. One side of each indicator is grounded and the other is connected to the supply line that supplies electric current to the magnetic clutch winding 31. These indicators are preferably in the form of electric lamps but may be in the form of audible buzzers. If the indicators are in the form of lamps their function is to burn only during the period that the clutch is energized or during the period that a transition is being made of the lever 12 from one position to another.

*Operation*

The operation of the above-described construction is substantially as follows:

Assuming that the selector switch 66 is in the position shown on FIG. 6, making control 52 operative and control 53 inoperative, and assuming that the transmission 10 is in neutral position the cam 35 will be in the positions shown in FIGS. 4 and 6 wherein switches 38 and 39 are both closed but the neutral switches 36 and 37 are both open. If the control lever of control 52 is swung forwardly segment 54 will transmit current from battery 56 from contact 55 to contact 58 through the selector 66 to the contacts 46 of switch 38. This will energize the forward relay 48 causing this relay to close and cause electric current to be supplied to the forwardly rotating winding of the reversible motor 30. The motor will consequently rotate in a forward direction driving the countershaft 27. At the same time winding 31 will be energized attracting the armature plate 34 into frictional engagement with the flanged hub 32, thus establishing a driving connection between the countershaft 27 and the pinion 26, thus driving shaft 15 and causing arm 18 to swing forwardly toward the full line position shown in FIG. 1.

As the shaft 15 rotates it not only swings the arm 18 forwardly but it rotates the cam 35 in a counterclockwise direction as viewed in FIG. 4. Rotation of the cam in this direction ultimately allows switch 37 to close and causes the forward switch 38 to open. When switch 38 opens it deenergizes the relay 48 discontinuing further rotation of the motor and deenergizing the coil 31 of the magnetic clutch. During the period that the motor is operated and the clutch is energized the indicators 72 and 73 are operative indicating that a transition is occurring. On completion of the transition and the opening of switch 38 the indicators 72 and 73 stop indicating.

If the transmission is in its forward position and it is desired to return to neutral, control 52 is returned to neutral connecting contact 55 with contact 59. This supplies current through the selector switch 66 to the two neutral switches 36 and 37. However, as switch 36 remains open during the rotation of the cam 35 in a counterclockwise direction as viewed in FIG. 4, and only neutral switch 37 has closed, the current is conducted through switch 37 to the reverse lead 49 leading to relay 50. When relay 50 closes the motor 30 is rotated in a reverse direction reversely rotating cam 35 back to the position shown in FIG. 4. When the cam returns to this position switch 37 is again opened and switch 38 is again closed. The opening of switch 37 discontinues further rotation of the motor 30 and deenergizes the clutch but also causes the indicators 72 and 73 to discontinue their operation.

If the lever of control 52 is moved from neutral to a reverse position contactor 54 connects contacts 55 and 60 which causes electric current to be supplied through the selector switch 66 to the reverse switch 39. This closes relay 50 causing the motor 30 to rotate reversely to swing lever 12 from neutral to its reverse position. Cam 35 is rotated in a clockwise direction as viewed in FIG. 4, ultimately opening switch 39 and allowing switch 36 to close. The opening of switch 39 stops rotation of the motor, deenergizes the magnetic clutch and deenergizes the indicators 72 and 73.

A return to neutral from the reverse position is accomplished by swinging the control 52 to the position shown on FIG. 6 which will cause electric current to be supplied to the then closed neutral switch 36. This causes the forward relay 48 to close and the motor 30 to be rotated in a forward direction and the magnetic clutch to be energized until the cam 35 has returned to its neutral position.

In some instances there is occasion to swing the control lever 52 from its forward position through neutral to a reverse position, or vice versa. It is not necessary to move the control lever to neutral position, wait for the mechanism to return to neutral and then move the control lever to reverse. On the contrary a direct throw from forward to reverse through neutral can be performed. If the mechanism is in forward position as above described the cam 35 will be in a position opening switch 38 and closing switch 37. If the control lever is then swung into reverse position current is supplied through contacts 55 and 60 and the selector switch 66 to the reverse switch 39 which is then closed. This closes relay 50 and causes the motor 30 to rotate in a reverse direction until the cam 35 has rotated sufficiently to open the reverse switch 39 and allow neutral switch 36 to close. Consequently, under these circumstances the motor 30 continues to rotate reversely from the forward position through neutral to the reverse position. The converse is equally true. That is, if the control lever 52 is in the reverse position it may be moved through neutral directly into its forward position, in which case the motor 30 will be driven forwardly through neutral until lever 12 has been moved into its forward position.

It is obvious that on shifting the selector switch 66 that control 52 will be disconnected and control 53 will be connected. The operation of control 53 is the same as above described in connection with control 52.

It is conceivable in devices of this character which are subject to the corrosive effects of weather that certain contacts may stick. These may be the contacts of the relays 48 and 50 when the relays are employed, or it may be the contacts of the switches 36, 37, 38, and 39. If such mal-functioning should occur causing the motor 30 to continue to be energized beyond the selected position the clutch likewise remains energized. The mechanism, instead of destroying itself, will cause the motor to attempt to overcome the friction between the armature plate 34 and the flanged hub 32. This overloads the motor and the circuit breaker 51 becomes effective to break the circuit through the motor preventing the mechanism from destroying itself. In the event that the circuit breaker 51 has opened or any other mal-functioning of the apparatus occurs it will be noted that the magnetic clutch 31 is deenergized. In spite of the fact that a worm and worm wheel as at 29 and 28 is ordinarily irreversible the deenergizing of the magnetic clutch leaves the pinion 26, the gear 25, and the shaft 15 free. Consequently, if a mal-functioning of the apparatus should occur these parts that are connected to the lever 12 are all free enabling the lever 12 to be manually shifted.

By having the indicators 72 and 73 connected to be operative only during periods of transition a number of indications are made. If lever 52 is moved forwardly but indicator 72 fails to indicate, this indicates that a mal-functioning has occurred and that the apparatus for some reason has failed to operate. On the other hand, if indicator 72 does operate for a limited period of time and then stops it indicates that the transition from one position to another has been completed. On the other hand, if the indicator 72 continues to function after a reasonable length of time this also indicates that although a transition has occurred some other mal-functioning of the apparatus is continuing. Consequently, the same indicator will indicate not only the occurrence of a transition but any failure of the apparatus so that remedial steps can promptly be taken. Even if the remedial steps cannot be promptly taken the apparatus is not locked but will be freed on the deenergizing of the magnetic clutch permitting the transmission lever 12 to be operated manually.

A feature of the invention resides in the fact that there are two switches 36 and 37 each of which function as limit switches limiting the operation of the reversible motor in returning the reverse gear transmission to neutral. All of the switches 36, 37, 38, and 39 are precisely adjustable in relation to the cam and consequently switches 36 and 37 will precisely limit or stop the operation of the mechanism when a return to neutral has been completed. This is of considerable importance when the mechanism is used with those transmission having different throws for forward and reverse. Some transmissions have their lever 12 movable forwardly from neutral a distance of 5", but only a movement from neutral to reverse of 1". It will be appreciated that the mechanism disclosed herein is applicable thereto, can be precisely adjusted to return the lever 12 to neutral and then stop from either forward position or reverse position, and that there is no overthrow or excess of movement through the neutral position.

In either of the extreme positions, that is forward or reverse, on completion of the movement by the mechanism the magnetic clutch is automatically deenergized. The deenergizing of the magnetic clutch frees all parts between the magnetic clutch and lever 12 so that these may adjust themselves or accommodate themselves to the position that the lever 12 may desire to assume in any of its positions. Frequently a detent incorporated in the reverse gear transmission will tend to center or locate the lever 12 in any of those three positions, and this is not hindered by the mechanism due to the automatic releasing accomplished by the magnetic clutch.

As indicated on the drawing an "off" and "on" switch is usually located between the battery or source of electric current and the selector switch.

Various changes may be made in the details of construction without departing from the spirit and scope of the invention as defined by the appended claims.

I claim:

1. In combination with a reverse gear transmission adapted to be driven by a power source and operable by a lever swingable into forward, neutral, and reverse positions, electrically operable means for moving the lever into each of said positions and from one position to another including a reversible electric motor, a control movable into forward, reverse, and neutral positions having forward, reverse and neutral contacts engageable in said positions respectively, a first switch controlling forward rotation of the motor electrically connected to the forward contact, a second switch controlling reverse rotation of the motor electrically connected with the reverse contact, and two neutral switches electrically connected with the neutral contact, one of said two neutral switches being companion to the first switch and being connected to control forward rotation of the motor and the other of said two switches being companion to the second switch and being connected to control reverse rotation of the motor, and means for causing the first and second switches to be closed and said two neutral switches to be opened when the control is in neutral position, the first switch to open and its companion switch to close after the motor has run forwardly a predetermined time when the control has been moved into its forward position and the second switch to open and its companion switch to close after the motor has run reversely for a predetermined time when the control has been moved to reverse position, and electric indicators electrically connected to the first and second switches so as to be operable only when one of said first or second switches is closed to cause the motor to be operated.

2. In combination with a reverse gear transmission adapted to be driven by a power source and shiftable into forward, neutral, and reverse positions, a reversible electric motor having forward and reverse circuits, means connecting the motor to the transmission for shifting the transmission into either of said positions including a magnetic clutch in circuit with the forward and reverse circuits so as to be energized and deenergized therewith enabling the transmission to be manually shifted when the clutch is deenergized.

3. In combination with a reverse gear transmission adapted to be driven by a power source and shiftable into forward, neutral, and reverse positions, a reversible electric motor having forward and reverse circuits, means connecting the motor to the transmission for shifting the transmission into either of said positions including a magnetic clutch in circuit with the forward and reverse circuits so as to be energized and deenergized therewith enabling the transmission to be manually shifted when the clutch is deenergized, and an overload circuit breaker in circuit with the motor whereby if the clutch remains engaged beyond the required length of time to effect a shifting of the transmission overloading of the motor may occur causing the circuit breaker to break the circuit.

4. In combination with a reverse gear transmission adapted to be driven by a power source and shiftable into forward, neutral, and reverse positions, a reversible electric motor having forward and reverse circuits, means connecting the motor to the transmission for shifting the transmission into either of its positions, cam means driven by the motor into positions corresponding to forward, neutral, and reverse, a forward switch controlling the forward circuit of the motor, a reverse switch controlling the reverse circuit of the motor, a neutral switch companion to the forward switch in parallel with the reverse switch, a second neutral switch companion to the reverse switch in parallel with the forward switch, said cam means causing the forward switch and the reverse switch to be closed when the transmission is in neutral position, the forward switch to be opened and its companion switch to be closed when the transmission is in forward position and the reverse switch to be open and its companion switch to be closed when the transmission is in reverse position, and a plurality of control means each of which can selectively supply electric current to the forward switch, the reverse switch, or to the companion switches, and selector switch means for causing either of the control means to be operable to the exclusion of the other.

5. In combination, a reverse gear transmission adapted to be driven by a power source and shiftable into forward, neutral and reverse positions, a reversible electric motor having forward and reverse circuits, means including a magnetic clutch connecting the motor to the transmission for shifting the transmission into either of its positions, cam means driven by the motor into positions corresponding to forward, neutral, and reverse, a forward switch controlling the forward circuit of the motor, a reverse switch controlling the reverse circuit of the motor, a neutral switch companioned to the forward switch in parallel with the reverse switch, a second neutral switch companioned to the reverse switch in parallel with the forward switch, said cam means causing the forward switch and the reverse switch to be closed when the transmission is in neutral position, the forward switch to be opened and its companion switch to be closed when the transmission is in forward position and the reverse switch to be opened and its companion switch to be closed when the transmission is in reverse position, a plurality of control means each of which can selectively supply electric current to the forward switch, the reverse switch, or to the companion switches, selector switch means for causing either of the control means to be operable to the exclusion of the other, forward and reverse relays in circuit with the forward switch, the reverse switch, and the companion switches controlling the circuits through the motor and the magnetic clutch, and indicator means adjacent each of the control means in circuit with the relays and in parallel with the magnetic clutch.

6. In combination, a reverse gear transmission adapted to be driven by a power source and shiftable into forward, neutral and reverse positions, a reversible electric motor having forward and reverse circuits, means including a magnetic clutch connecting the motor to the transmission for shifting the transmission into either of its positions, cam means driven by the motor into positions corresponding to forward, neutral, and reverse, a forward switch controlling the forward circuit of the motor, a reverse switch controlling the reverse circuit of the motor, a neutral switch companioned to the forward switch in parallel with the reverse switch, a second neutral switch companioned to the reverse switch in parallel with the forward switch, said cam means causing the forward switch and the reverse switch to be closed when the transmission is in neutral position, the forward switch to be opened and its companion switch to be closed when the transmission is in forward position and the reverse switch to be opened and its companion switch to be closed when the transmission is in reverse position, a plurality of control means each of which can selectively supply electric current to the forward switch, the reverse switch, or to the companion switches, selector switch means for causing either of the control means to be operable to the exclusion of the other, forward and reverse relays in circuit with the forward switch, the reverse switch, and the companion switches controlling the circuits through the motor and the magnetic clutch, and indicator means adjacent each of the control means in circuit with the relays and in parallel with the magnetic clutch, the motor circuit including a thermostatic overload circuit breaker.

References Cited in the file of this patent
UNITED STATES PATENTS

| | | |
|---|---|---|
| 2,248,564 | Wood | July 8, 1941 |
| 2,349,740 | McCollum | May 23, 1944 |
| 2,714,435 | D'Ozouville | Aug. 2, 1955 |